US012515896B2

(12) United States Patent
Ragan et al.

(10) Patent No.: US 12,515,896 B2
(45) Date of Patent: Jan. 6, 2026

(54) MAGNETIC CONVEYOR SYSTEM

(71) Applicant: Laitram, L.L.C., Harahan, LA (US)

(72) Inventors: Bryant G. Ragan, Metairie, LA (US); Matthew L. Fourney, Laurel, MD (US)

(73) Assignee: Laitram, L.L.C., Harahan, LA (US)

( * ) Notice: Subject to any disclaimer, the term of this patent is extended or adjusted under 35 U.S.C. 154(b) by 65 days.

(21) Appl. No.: 18/708,419

(22) PCT Filed: Sep. 14, 2022

(86) PCT No.: PCT/US2022/043499
§ 371 (c)(1),
(2) Date: May 8, 2024

(87) PCT Pub. No.: WO2023/096694
PCT Pub. Date: Jun. 1, 2023

(65) Prior Publication Data
US 2025/0011109 A1 Jan. 9, 2025

Related U.S. Application Data

(60) Provisional application No. 63/282,458, filed on Nov. 23, 2021.

(51) Int. Cl.
*B65G 54/02* (2006.01)
*B65G 43/08* (2006.01)
*H02K 41/03* (2006.01)

(52) U.S. Cl.
CPC ............. *B65G 54/02* (2013.01); *B65G 43/08* (2013.01); *H02K 41/031* (2013.01); *H02K 41/033* (2013.01)

(58) Field of Classification Search
CPC ...... B65G 54/02; B65G 43/08; H02K 41/031; H02K 41/033
(Continued)

(56) References Cited

U.S. PATENT DOCUMENTS 5,251,741 A  10/1993  Morishita et al.
8,333,274 B1  12/2012  Lykkegaard
(Continued)

FOREIGN PATENT DOCUMENTS

DE  102020135153 A1 *  6/2022  ........... H02K 41/031
DE  102021105105 A1 *  9/2022  ............. B65G 54/02
(Continued)

*Primary Examiner* — James R Bidwell
(74) *Attorney, Agent, or Firm* — James T. Cronvich

(57) ABSTRACT

A magnetic conveyor (30) comprising article-supporting movers (80) propelled by an array of stator elements (72) arranged in rows and columns. The movers include permanent magnets (82) whose magnetic fields interact with electromagnetic waves produced by the stator elements. Some of the stator elements produce electromagnetic waves that travel parallel to a conveying direction and others produce electromagnetic waves that can be controlled to travel in any direction. Movers are arranged in a formation of rows and columns in a staging area. An article (34) is transferred onto a group of movers in forward rows of the formation in the staging area. The group separates from the staging area as it conveys the article in the conveying direction. Stator elements are energized to replenish the staging area with movers to fill the gaps left by the article-conveying group of movers.

25 Claims, 13 Drawing Sheets

(58) Field of Classification Search
USPC .................................................. 198/619, 805
See application file for complete search history.

(56) References Cited

U.S. PATENT DOCUMENTS

| | | | |
|---|---|---|---|
| 8,967,051 B2 | 3/2015 | King et al. | |
| 11,305,948 B2 * | 4/2022 | Koscielski | .............. B23P 21/00 |
| 2015/0097498 A1 * | 4/2015 | Hemati | ................ H02K 41/031 |
| | | | 318/135 |
| 2020/0030401 A1 | 1/2020 | Li et al. | |
| 2020/0102160 A1 * | 4/2020 | Haya | .................... H02K 41/031 |

FOREIGN PATENT DOCUMENTS

| | | | | |
|---|---|---|---|---|
| DE | 102022126200 A1 * | 4/2024 | ............. | B65G 54/02 |
| DE | 102023100151 A1 * | 7/2024 | ............. | B65G 54/02 |
| EP | 2779390 A2 | 9/2014 | | |
| EP | 4033645 A1 * | 7/2022 | ............. | H02K 21/24 |
| WO | 2013059934 A1 | 5/2013 | | |

* cited by examiner

MAGNETIC CONVEYOR SYSTEM

BACKGROUND

The invention relates generally to power-driven conveyors and more particularly to magnetic conveyor systems.

Roller-belt conveyors, powered-roller conveyors, and slat conveyors are used to convey articles. The conveyors can align articles, adjust the gaps between articles, and selectively divert articles over a side or transfer articles off the end of the conveyor. But the rollers in roller-belt conveyors and in powered-roller conveyors and the shoes in slat conveyors are noisy. And roller-actuation mechanisms in roller-belt conveyors and guide tracks for the shoes in slat conveyors add to the noise.

SUMMARY

One version of a magnetic conveyor comprises an array of stator elements arranged in rows and columns on a conveying path that extends in length in a conveying direction. The stator elements are energizable to produce electromagnetic flux waves. Movers have permanent magnets with magnetic fields that interact with the electromagnetic flux waves to move along and across the conveying path in a conveying direction. The array of stator elements are energized in a staging area on the conveying path to arrange the movers in rows and columns above the stator elements. An article transferred onto the conveying path atop a group of movers in the staging area is conveyed on the conveying path by the group of movers.

Another version of a magnetic conveyor comprises a carryway, a returnway, and curved first and second reversing segments. The carryway extends in length in a conveying direction from a first carryway end to a second carryway end and includes a series of carryway segments. The returnway extends in length from a first returnway end to a second returnway end and includes a series of returnway segments. The curved first reversing segment extends from the second carryway end to the first returnway end, and the curved second reversing segment extends from the second returnway end to the first carryway end to form an endless conveying path. One-direction stators each produce an electromagnetic flux wave that travels in the conveying direction parallel to the conveying path. Two-direction stators are each capable of producing a first electromagnetic wave that travels in a first direction and a second electromagnetic wave that travels in a second direction transverse to the first direction. The carryway includes one or more one-direction stators or two-direction stators. The returnway includes one or more two-direction stators. The curved first and second reversing segments each include a one-direction stator or a two-direction stator. Article-supporting movers having permanent magnets are arranged in rows and columns are selectively driven by the one-direction stators and the two-direction stators to convey articles along and across the endless conveying path.

DETAILED DESCRIPTION

Figure 1:
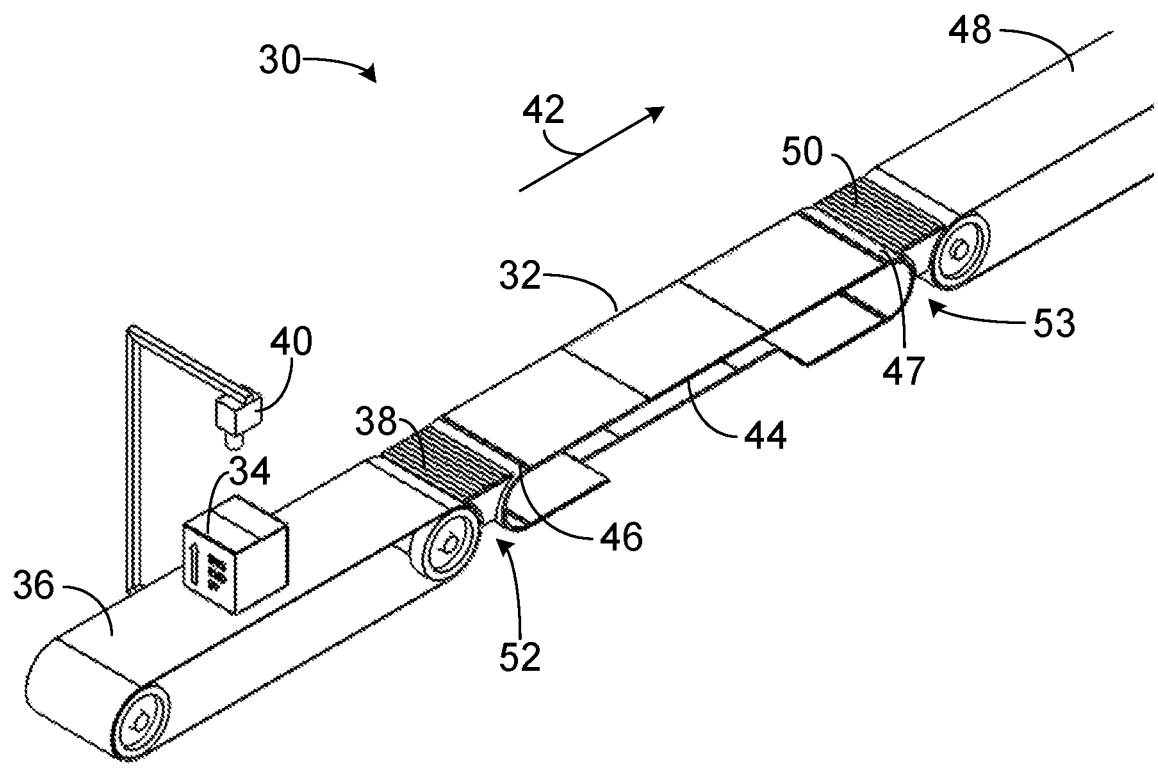
FIG. 1 is an isometric view of a portion of a magnetic conveyor system embodying features of the invention.

FIG. 1 is an isometric view of one version of a conveyor system including a magnetic conveyor embodying features of the invention. The conveyor 30 comprises a magnetic conveyor 32 arranged to receive articles 34, such as packages, from an infeed conveyor 36 over an infeed transfer element 38. An imaging system 40, such as a camera or a rangefinder, captures frames of the articles 34 conveyed on the infeed conveyor 36 so that their footprints, orientations, and lateral positions on the infeed conveyor can be determined. The articles 34 pass from the infeed conveyor onto the magnetic conveyor 32 over the infeed transfer element 38. The magnetic conveyor 32 conveys the articles 34 in a conveying direction 42 along a conveying path on an upper carryway 44 from a first carryway end 46 downstream to a second carryway end 47. The articles 34 exit the carryway 44 at the second carryway end 47 and pass onto a discharge conveyor 48 over a discharge transfer element 50.

The transfer elements 38, 50 can have active driven rollers forming their top surfaces to push the articles 34 across. Or the rollers can be passive if the infeed conveyor 36 and the magnetic conveyor 32 convey the articles 34 with enough momentum to coast across. If the length of the transfer elements 38, 50 are small enough, rollers may not be necessary, and the top surfaces of the transfer elements can be smooth surfaces. For articles that have footprints that are long enough in the conveying direction to bridge gaps 52, 53 between the infeed and discharge conveyors 36, 48 and the magnetic conveyor 32 without catching, the transfer elements 38, 50 may not be necessary.

Figure 2:
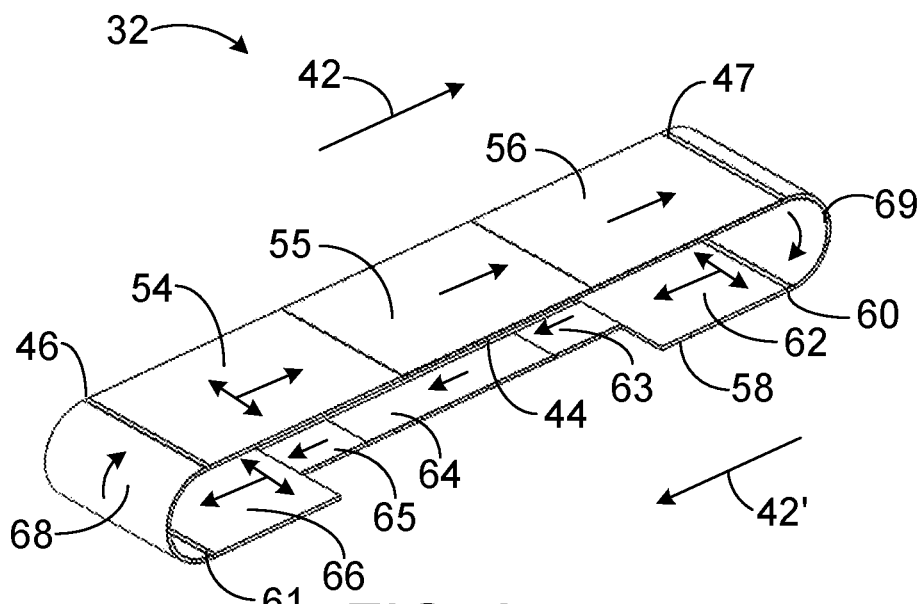
FIG. 2 is an isometric view of stator segments in a magnetic conveyor of the magnetic conveyor system of FIG. 1.

Further details of the magnetic conveyor 32 are described in reference to FIG. 2. The carryway 44 in this example is shown with three carryway segments 54, 55, 56 laid out in series between the infeed carryway end 46 and the discharge carryway end 47. Each carryway segment 54, 55, 56 includes either a one-direction stator or a two-direction stator. A one-direction stator produces an electromagnetic flux wave that travels in a single direction, namely parallel to conveying direction 42 along the carryway 44. Two-direction stators produce electromagnetic flux waves that can have components in two directions, such as one component parallel to the conveying direction 42 and the other component transverse to the conveying direction, e.g., perpendicular to the conveying direction across the width of the carryway. If the magnetic conveyor of FIG. 2 is used to align and fix the gap between consecutive articles, the first carryway segment 54 could contain a two-direction stator, and the downstream second and third carryway segments 55, 56 could contain one-direction stators, as indicated by the arrows in each segment.

The magnetic conveyor 32 has a returnway 58 below the carryway 44 in this version. The returnway 58 extends in length from a first returnway end 60 to a second returnway end 61. The returnway 58 is divided into a series of returnway segments 62, 63, 64, 65, 66. The returnway segments 62, 66 at the first and second returnway ends 60, 61 include two-direction stators. The intermediate returnway segments 63, 64, 65 include one-direction stators. The intermediate returnway segments 63, 64, 65 are narrower in width than the segments 62, 66 at the returnway ends 60, 61 in this version. But all the segments could be the same width. In the returnway 58 the conveying direction 42' is opposite the conveying direction 42 on the carryway 44.

A curved first reversing segment 68 extends from the second returnway segment 66 to the first carryway segment 54, and a curved second reversing segment 69 extends from the second carryway segment 56 to the first returnway segment 62 to complete the conveyor loop. The reversing segments 68, 69 include one-direction stators.

Although the magnetic conveyor 32 is shown in an over-and-under configuration, the segments could be arranged in a racetrack configuration in which the reversing segments are turn segments that curve in the same plane.

Figure 3:
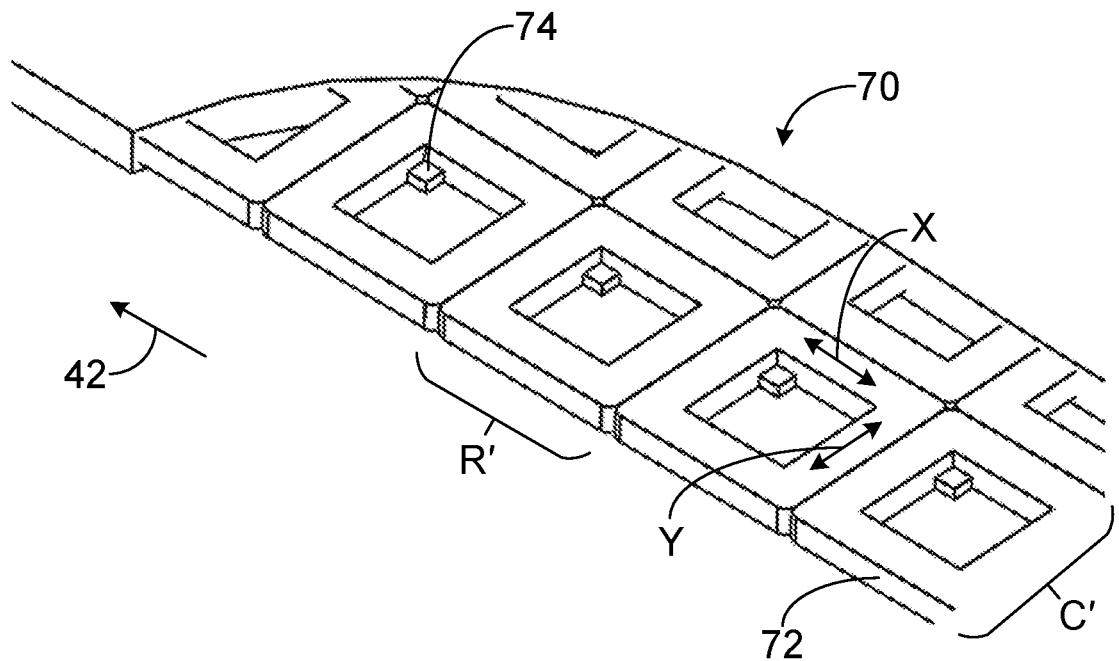
FIG. 3 is an enlarged isometric view of a portion of an array of two-direction stator coils in stator segments of FIG. 2.

As shown in FIG. 3, the two-direction stator 70 comprises an array of two-direction stator elements 72 having two three-phase coil sets, arranged in rows R' that extend across the width of the carryway and columns C' that extend along the length of the carryway in the conveying direction 42. Each two-direction stator element 72 includes a three-phase X-coil set that produces an electromagnetic flux wave that travels parallel to the conveying direction 42 and a three-phase Y-coil set that produces an electromagnetic flux wave that travels perpendicular to the conveying direction in the same plane. Each three-phase coil set includes three coils. By adjusting the relative amplitudes of the X- and Y-coil components of electromagnetic flux, the propagating direction of the resultant electromagnetic flux wave can be directed in any direction. And by controlling the absolute amplitudes of the two components, the magnitude of the resulting wave can be controlled. Although the X- and Y-coil sets have been described as perpendicular to each other with X and Y magnetic axes perpendicular to each other, they don't have to be. The X- and Y-coil sets are not shown explicitly in FIG. 3. Rather, the two-direction stator elements 72 are shown as potted or molded housings in which the two sets of coils are embedded or housed. Each two-direction stator element 72 includes a proximity sensor 74, such as a Hall-effect sensor.

Figure 4:
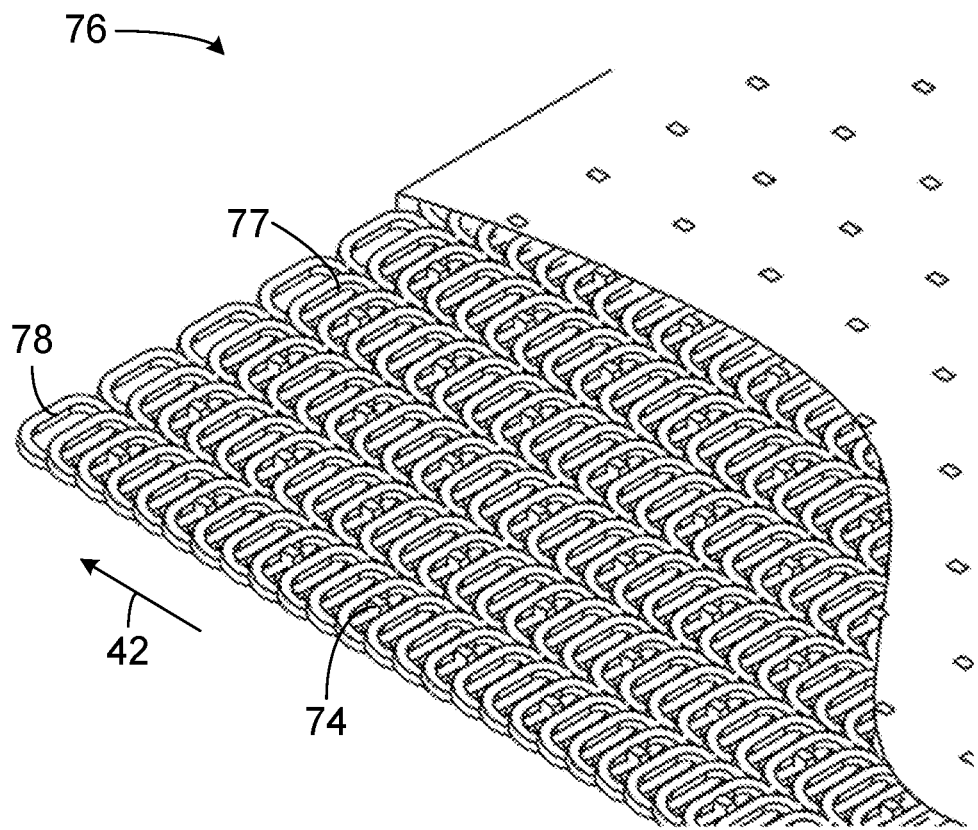
FIG. 4 is an enlarged isometric view of a portion of an array of one-direction stator coils in stator segments of FIG. 2.

FIG. 4 shows a portion of a one-direction stator 76, which propagates an electromagnetic flux wave parallel to the conveyor direction 42. The one-direction stator comprises an array of one-direction stator elements 77, each having a single three-phase coil set of three coils 78 with common magnetic axes. Proximity sensors 74, such as Hall-effect sensors, reside within the one-direction stator elements 77.

Figure 5:
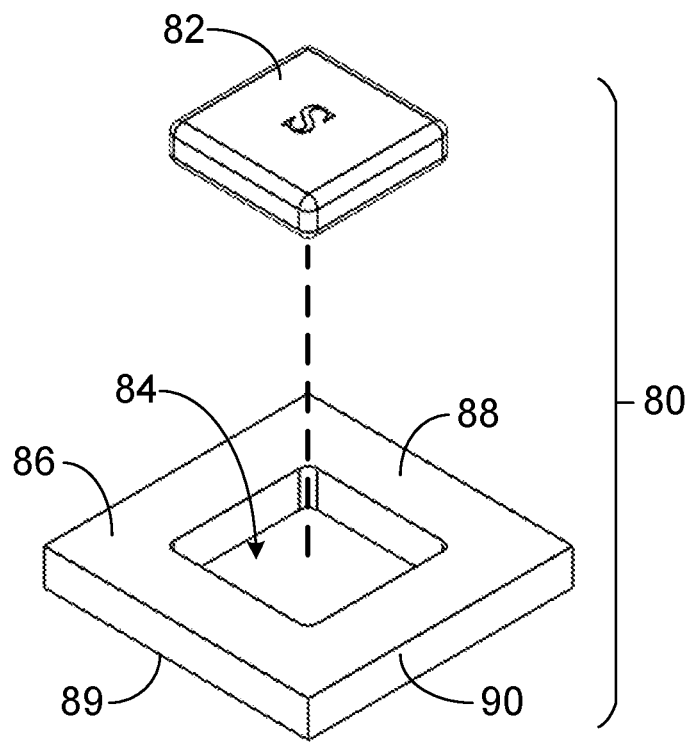
FIG. 5 is an exploded isometric view of a mover usable in a magnetic conveyor as in FIG. 1.

An article-supporting mover 80 that forms a synchronous motor with the stators is shown in FIG. 5. The mover 80 comprises a permanent magnet 82 residing in a cavity 84 in a housing 86. The electromagnetic flux waves produced by the stator elements interact with the magnetic field of the permanent magnet 82 to propel the mover 80 on the magnetic conveyor in a direction parallel to the traveling direction of the stator element's flux wave. The housing 86 in this example is shown as a square disk that has a top side 88, a bottom side 89, and an outer periphery 90. Conveyed articles sit on the top side 88. The central cavity 84 is indented inward of the periphery 90. By spacing the permanent magnets 82 of adjacent movers 80 farther apart, the borders around the indented magnets 82 reduce magnetic interaction with the magnetic fields of magnets in adjacent movers. The cavity 84 opens onto one or both of the top and bottom sides 88, 89.

Figure 6:
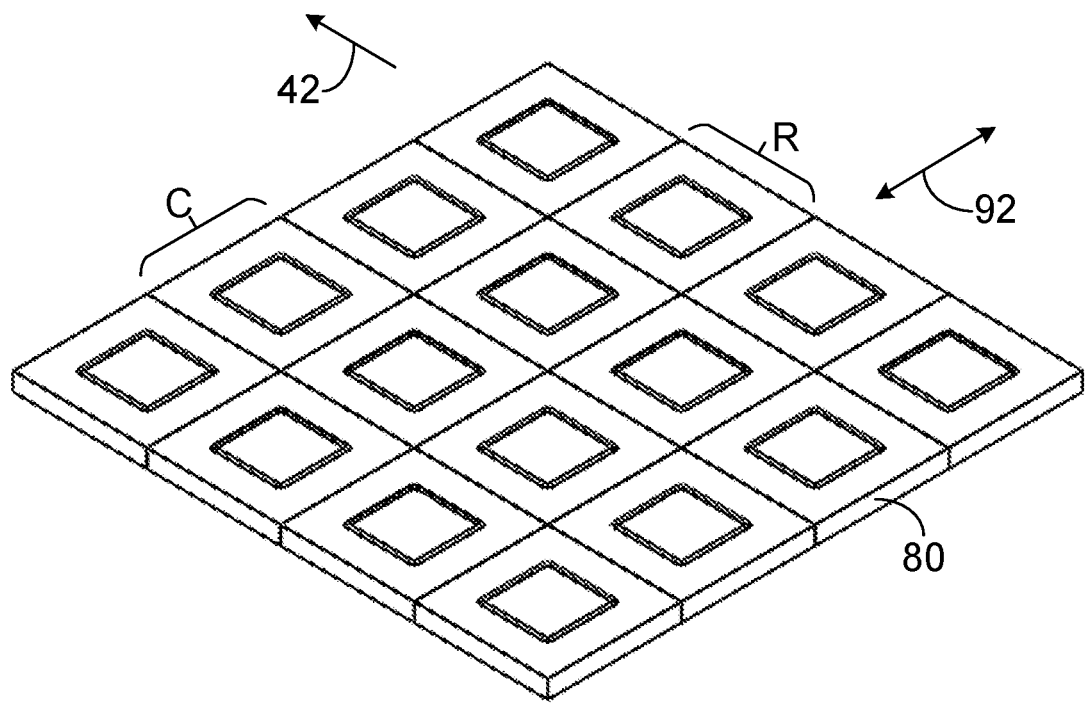
FIG. 6 is an isometric view of movers as in FIG. 5 arranged in an array.

Like the one- and two-direction stator elements 77, 72, the movers 80 can be arranged side by side in an array of rows R and columns C as shown in FIG. 6. The dimensions of the movers 80 are generally the same as the dimensions of the one- and two-direction stator elements. Unlike the one- and two-direction stator elements, the movers 80 are not stationary. Driven by the stator elements, the movers 80 can move individually or in groups by columns C along the conveying path or by rows R in a direction 92 transversely across the conveying path.

Figure 7:
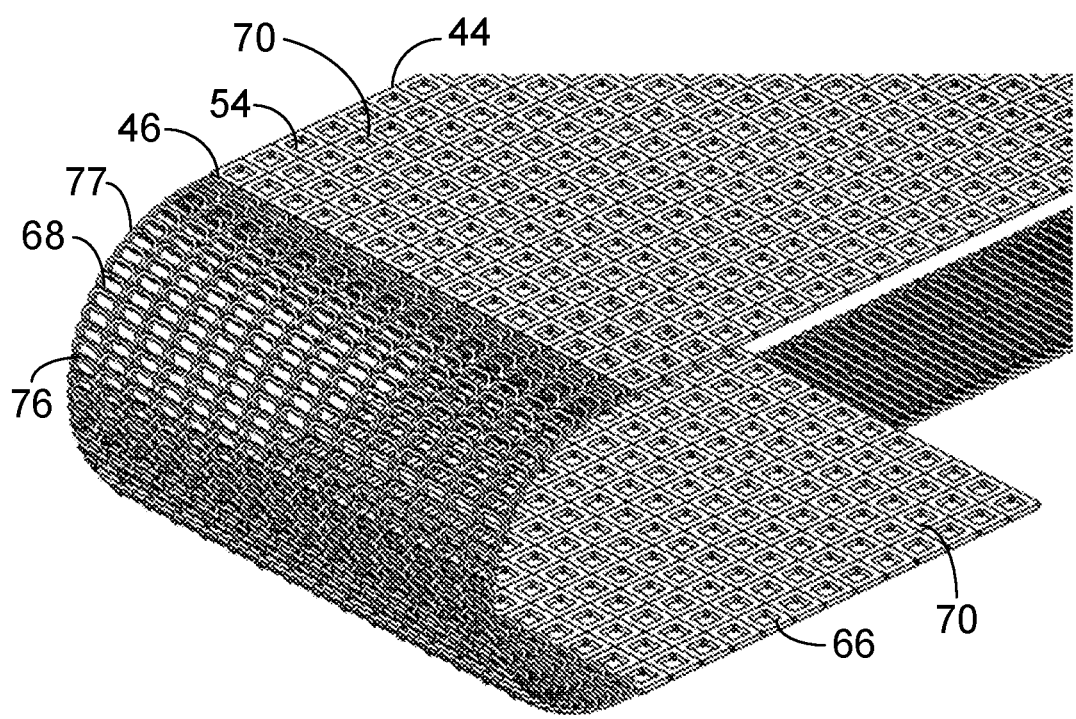
FIG. 7 is an isometric view of stator segments at an infeed end of the magnetic conveyor of FIG. 2.
Figure 8:
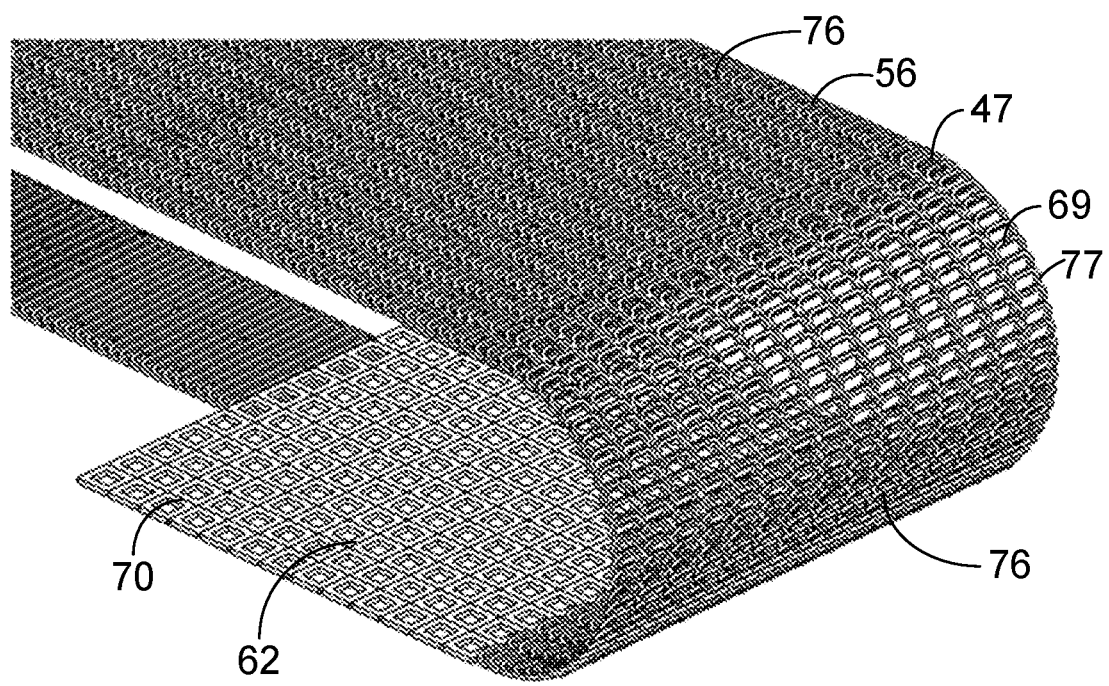
FIG. 8 is an isometric view of stator segments at a discharge end of the magnetic conveyor of FIG. 2.

FIG. 7 shows the infeed end 46 of the carryway 44, in which the carryway segment 54 at the infeed end includes a two-direction stator 70. The curved reversing segment 68 at the infeed end 46 includes a curved one-direction stator 76 composed of an array of one-direction stator elements 77. The returnway segment 66 at the infeed end includes a two-direction stator 70. At the discharge end 47 of the magnetic conveyor, as shown in FIG. 8, the curved reversing segment 69 connects between the carryway segment 56 at the discharge end 47 and the returnway segment 62. In this version the carryway segment 56 and the curved reversing segment 69 each include one-direction stators 76 but could include two-direction stators. The one-direction stator in the reversing segment 69 as shown is composed of a two-dimensional array of one-direction stator elements 77. But the reversing segment's stator could be realized with a series of wide one-direction stator elements that each extend across the full width of the reversing segment. Alternatively, the reversing segment 69 could include a two-direction stator. The returnway segment 62 at the discharge end includes a two-direction stator 70.

Figure 9A:
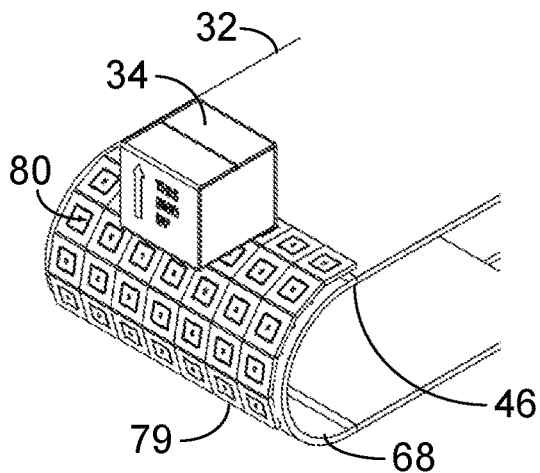
FIGS. 9A-9E are sequential isometric views of the infeed end of the magnetic conveyor of FIG. 2 illustrating the induction, centering, and conveying of an article.
Figure 9B:
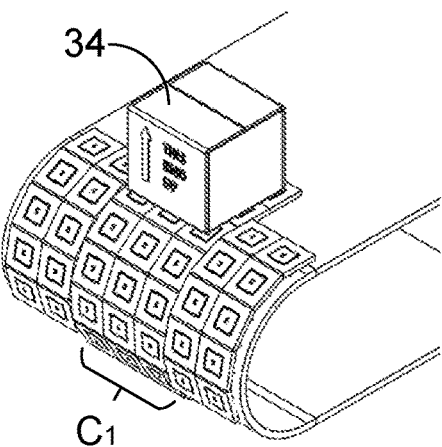
Figure 9C:
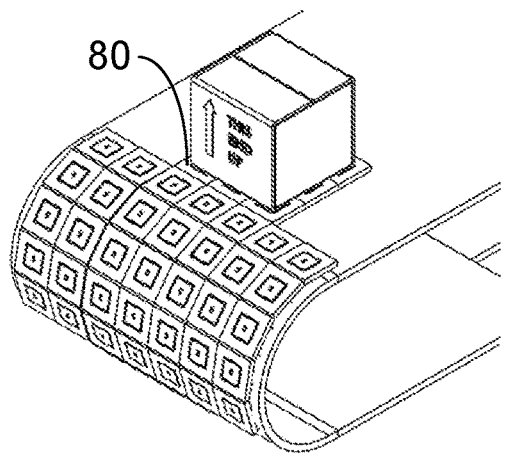
Figure 9D:
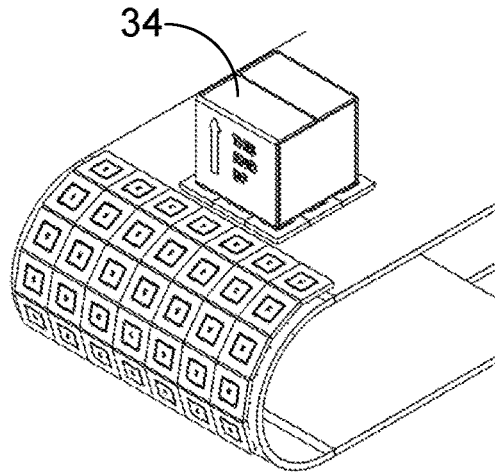
Figure 9E:
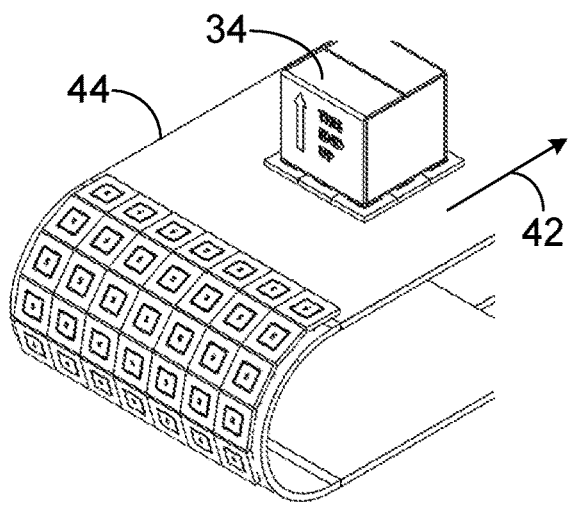

The induction of an article 34 onto the magnetic conveyor 32 at the infeed carryway end 46 is shown sequentially in FIGS. 9A-9E. In FIG. 9A the array 79 of movers 80 is shown in formation in a staging area at the infeed reversing segment 68. The staging area extends opposite the conveying direction 42 from a front at the infeed carryway end 46, around the reversing element 68, to a rear on the returnway. The columns $C_1$ of movers 80 under the article 34 are energized by the stators to advance along the conveying path as shown in FIG. 9B. The columns of movers not under the article 34 are not energized and remain in the staging area until another article covers them. When the group of movers 80 supporting the article 34 clears the staging area, it separates from the movers remaining in the staging area and carries the article 34 along the carryway 44 in the conveying direction 42, as shown in FIGS. 9C-9E. In this example the group of movers 80 forms a rectangular array of rows and columns whose dimensions are the minimum required to fit the article 34, i.e., to fit the article without overhang. Alternatively, the group of movers 80 could be shaped non-rectangularly to fit non-rectangular or skewed rectangular package shapes as long as the number of columns in a leading row of the group equals or exceeds the number of columns in a following row. As another example, if overhanging of an article beyond the group is allowed, the array could be as small as is required to support and move the article. The movers 80 trailing the group of movers supporting the article 34 fill in any gaps toward the front of the staging area by replacing the separated group to make ready to induct the next article.

Figure 10:
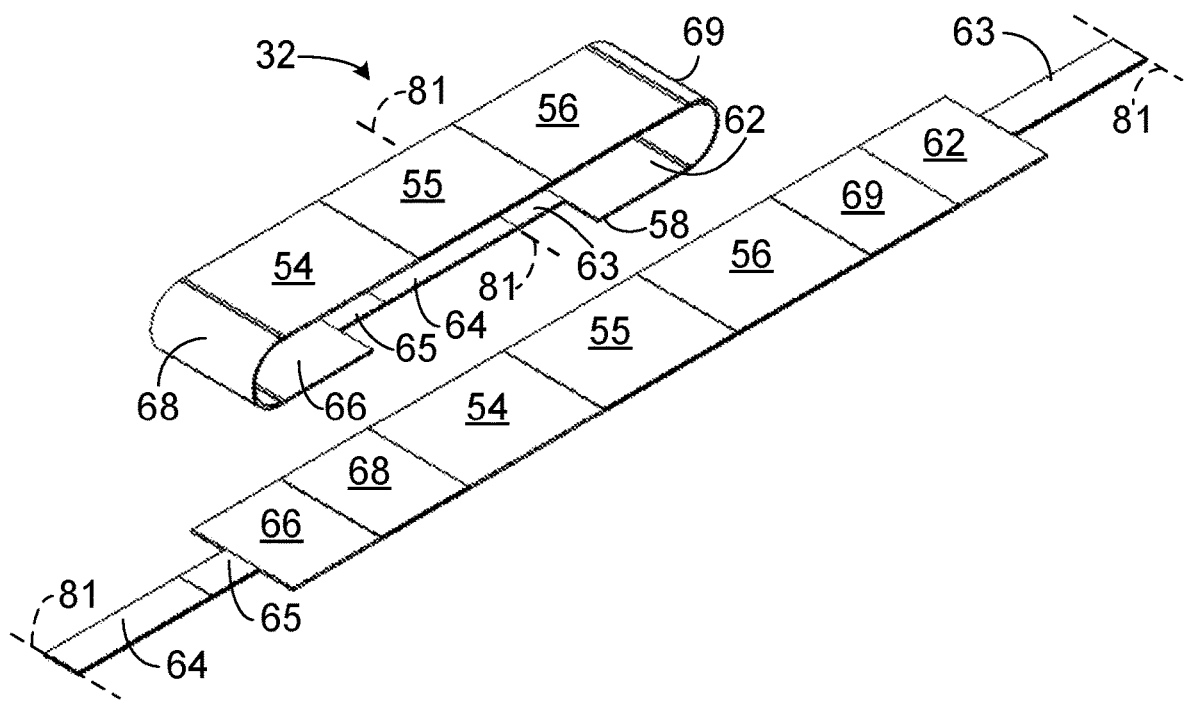
FIG. 10 shows isometric views of the magnetic conveyor of FIG. 2 in its looped operational layout and in a flattened linearized rendition to aid the description of its operation.

To simplify the description, the operation of the magnetic conveyor 32 is described by reference to a flattened, linearized rendition of the conveyor loop broken at an intermediate segment in the returnway 58 as indicated by the cut line 81 in FIG. 10, which shows the correspondence of the segments 54, 55, 56, 69, 62, 63, 64, 65, 66, 68 in the conveyor loop to the segments in the linearized rendition.

Figure 16:
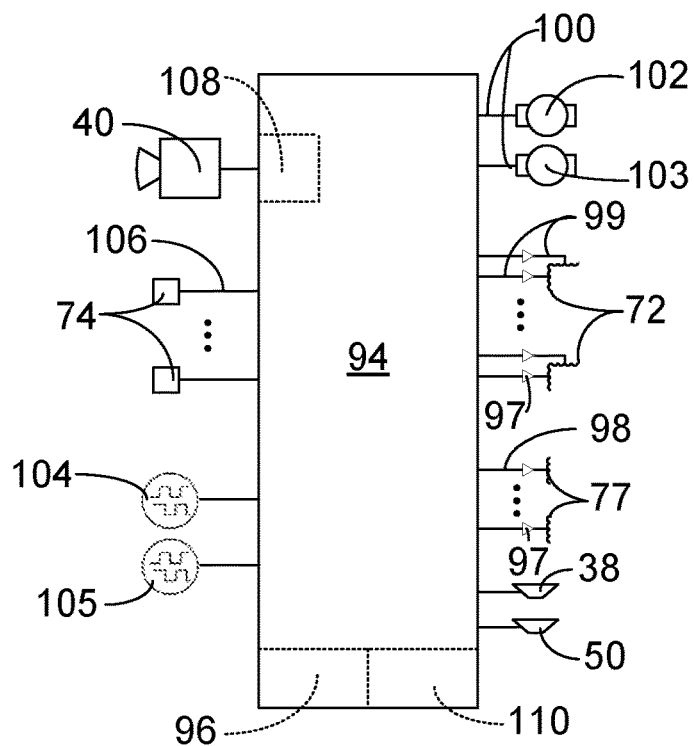
FIG. 16 is a block diagram of the magnetic conveyor system of FIG. 1.

FIG. 16 is a block diagram of a control system for the conveyor system 30 of FIG. 1. A processor 94 executing program instructions stored in a program memory 96 controls the one-direction stator elements 77 over first stator control lines 98 and the two-direction stator elements 72 over second stator control lines 99 via three-phase coil drivers 97 for each coil set. The processor 94 also controls the speeds of the infeed and discharge conveyors by sending speed signals over motor-control lines 100 to the drive-motor systems 102, 103. The processor 94 also controls the roller speeds of the infeed and discharge transfer elements 38, 50 if active elements are used. Encoders 104, 105 on the shafts of the drive motors for the infeed and discharge conveyors 36, 48 send feedback conveyor speed signals to the processor 94 so that the speeds of the conveyors can be properly determined and controlled. The processor 94 receives sensor signals 106 from the proximity sensors 74. The sensor signals 106 indicate the presence of movers at known sensor positions on the carryway, returnway, and reversing segments. The processor 94 uses the sensor signals 106, together with knowledge of the sensor positions, to determine the positions of each of the movers on the conveying path, to compute a subsequent movement increment for each mover, and to control the movement, i.e., the speed and direction, of each mover in a contiguous group of article-supporting movers with the stator elements 72, 77.

The main processor 94 also uses the sensor signals 106 from the returnway to compute movement increments to control the returnway stator elements and rearrange the empty movers to replenish the staging area. The processor 94 can control each stator element 72, 77 selectively and independently. The imaging system 40 continually captures images of the articles passing by on the infeed conveyor 36. The digital images are processed by imaging software executing in an imaging processor 108 to determine the footprints, positions, and speeds of the articles, which the main processor 94 uses to define a group of contiguous movers onto which an article is transferred and to control the stator elements 72, 77 to position the group of movers. The processor 94 stores temporary data in a data memory 110.

Figure 11A:
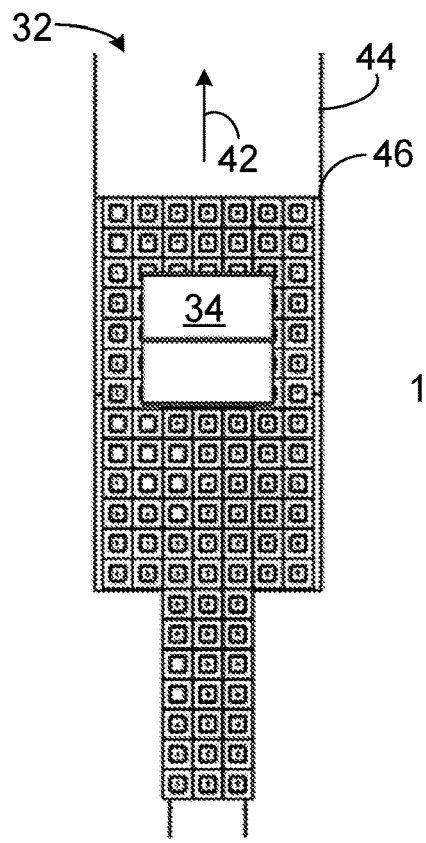
FIGS. 11A-11F are sequential plan views of the infeed end of the magnetic conveyor of FIG. 10 in its linearized rendition illustrating the induction, centering, and conveying of an article on the carryway as in FIGS. 9A-9E.
Figure 11B:
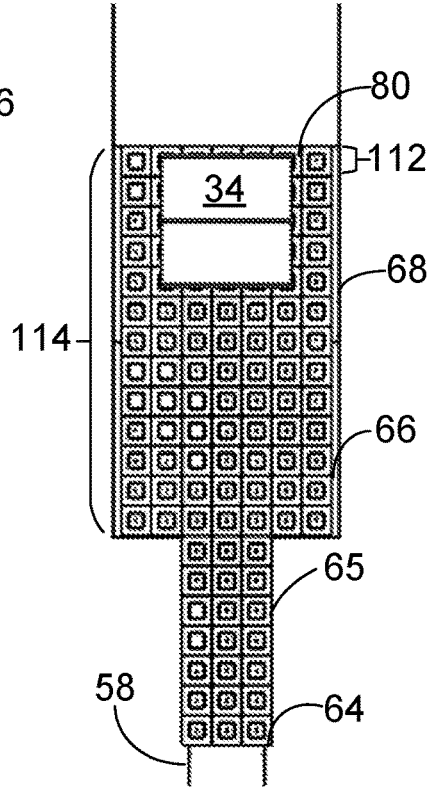
Figure 11C:
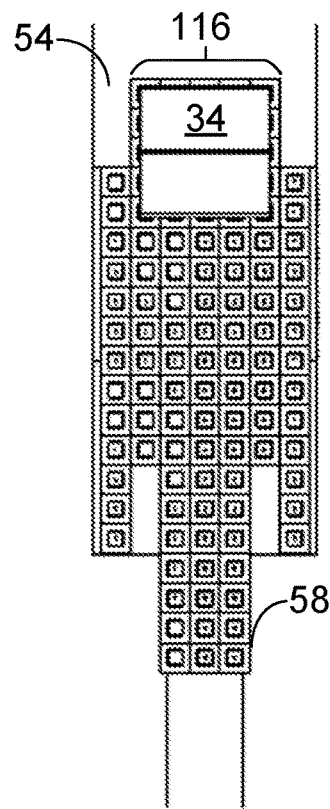
Figure 11D:
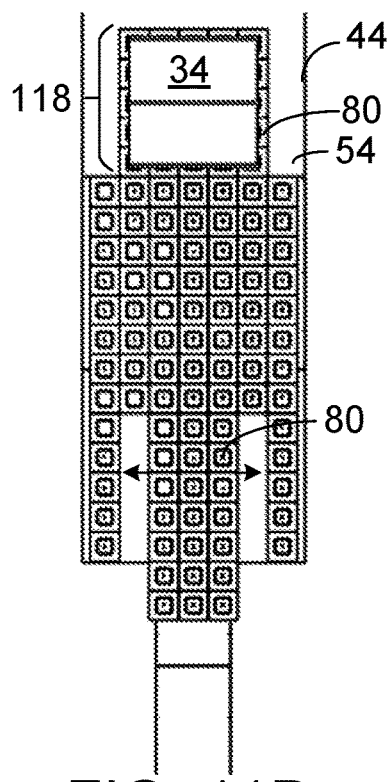
Figure 11E:
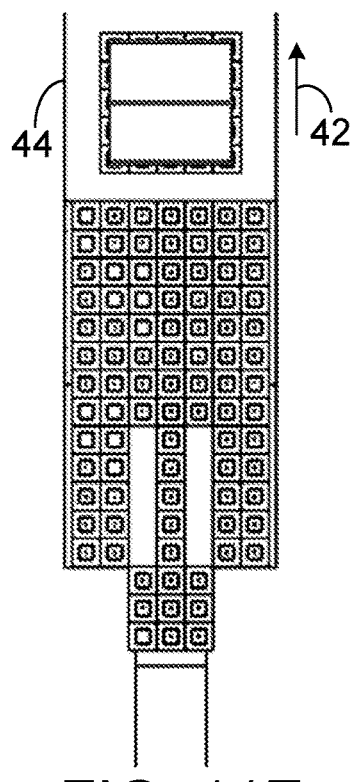
Figure 11F:
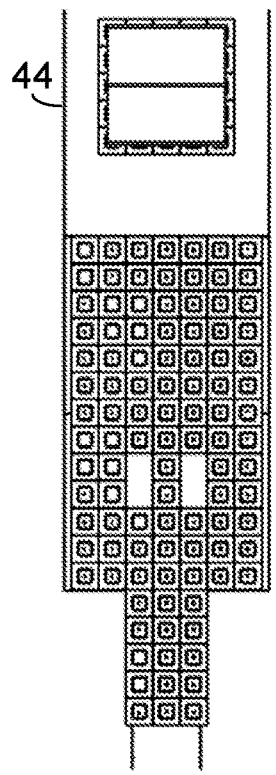

FIGS. 11A-11F show in more detail than in FIGS. 9A-9E the operation of the magnetic conveyor 32 inducting an article 34 onto the carryway 44 at the infeed carryway end 46 and conveying it in the conveying direction 42. In FIG. 11A the article 34 is shown approaching the magnetic conveyor 32. In FIG. 11B the article 34 is shown positioned on movers 80 in a leading row 112 of movers in the mover-staging area 114 on the curved infeed reversing segment 68 and the returnway segment 66 attached to the infeed reversing segment. Additional movers 80 populate the returnway 58 in returnway segments 64, 65. The processor, with knowledge of the speed of the article 34 from the infeed conveyor's shaft encoder or from consecutive images of the article's advance along the infeed conveyor, energizes the stators in all the columns 116 in the staging area 114 corresponding to the width of the article 34, as shown in FIG. 11C. The processor also energizes the stators in those columns in the returnway 58 (and in the reversing segment 68 for long articles) to advance any movers 80 to fill unoccupied positions in the staging area 114. The two-direction stators in the returnway segment 66 can move the movers 80 laterally along the row in either direction to replenish the staging area 114 as shown in the transition from FIG. 11D to FIG. 11E. As the group 118 of movers 80 advances from the staging area 114 and the infeed carryway segment 54 as shown in FIGS. 11C-11E, the stators in that segment covering the columns 116 and rows that have movers on them are energized. Once the article 34 and the group 118 of movers is completely on the carryway 44, as in FIGS. 11D-11E, the processor can control the stators in the infeed carryway segment 54 to, for example, speed up or slow down the speed of the article 34 to form uniform gaps between consecutive articles. In this case the stators in the carryway 44 can be one-direction stators.

Figure 12A:
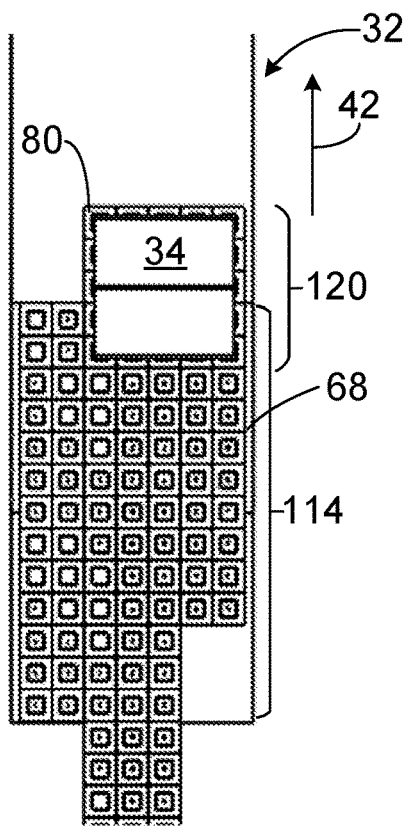
FIGS. 12A-12C are sequential plan views of the infeed end of the magnetic conveyor of FIG. 10 in its linearized rendition illustrating the centering of an article transferred on off-center.
Figure 12B:
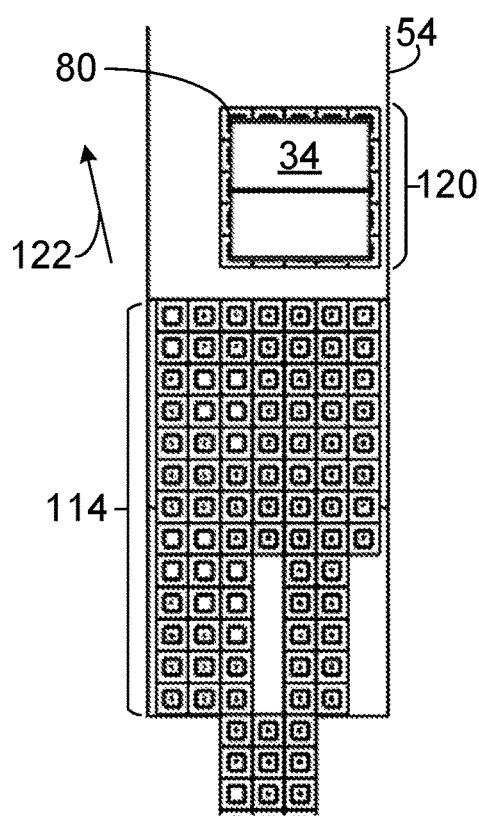
Figure 12C:
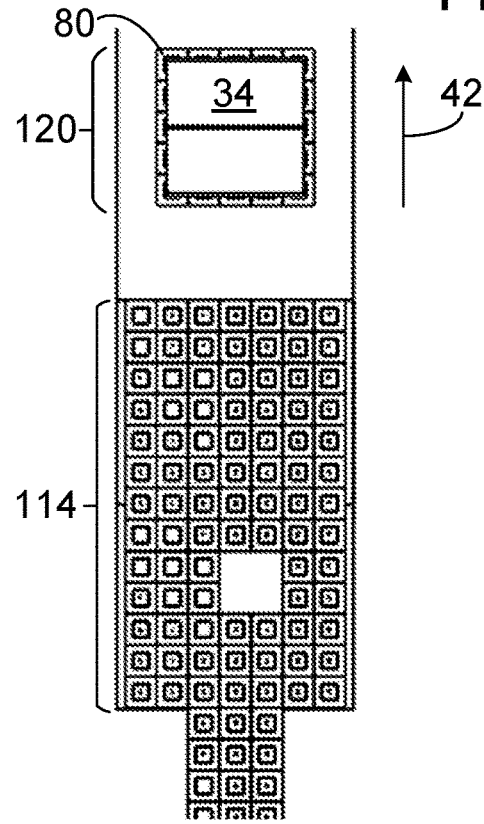

FIGS. 12A-12C show the magnetic conveyor 32 used to align (center in this example) articles 34. The article 34 is fed onto the magnetic conveyor laterally offset from the conveyor centerline in FIG. 12A. The stators in the reversing segment 68 push a group 120 of movers 80 supporting the article 34 from the staging area 114. When the article 34 and its supporting group 120 of movers 80 clears the staging area 114, two-direction stators in the infeed carryway segment 54 produce electromagnetic flux waves that cause the group of movers to move in a direction 122 oblique to the conveying direction 42 as shown in FIG. 12B. Once the article 34 is centered as shown in FIG. 12C, the carryway stators produce electromagnetic waves that cause the group of movers 80 to advance in the conveying direction 42. Of course, the same arrangement can be used to align the articles along either side of the conveyor or somewhere between the sides. While the article 34 is being centered, the staging area 114 is refilled as indicated by the transition from FIG. 12B to FIG. 12C.

Figure 13A:
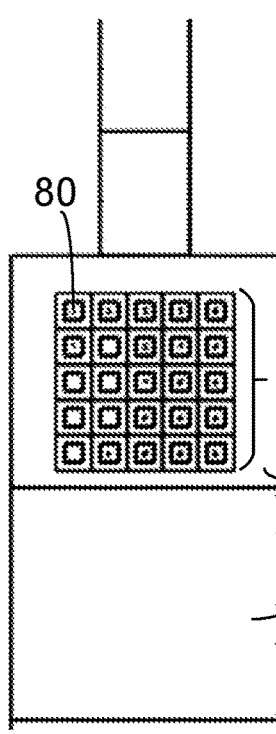
FIGS. 13A-13F are sequential plan views of the discharge end of the magnetic conveyor of FIG. 10 in its linearized rendition illustrating the reorganization of the movers on the returnway.
Figure 13B:
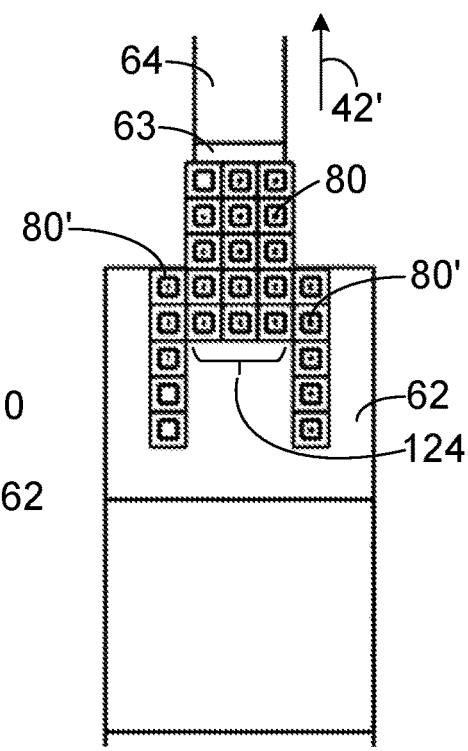
Figure 13C:
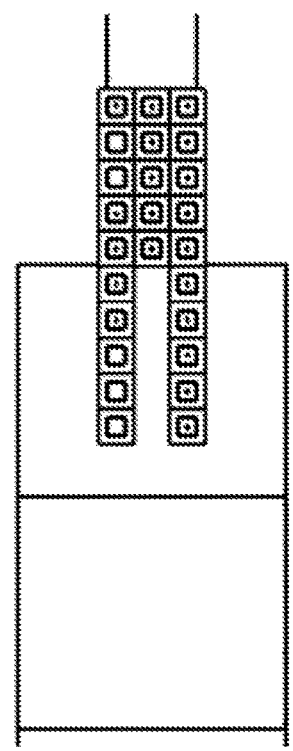
Figure 13D:
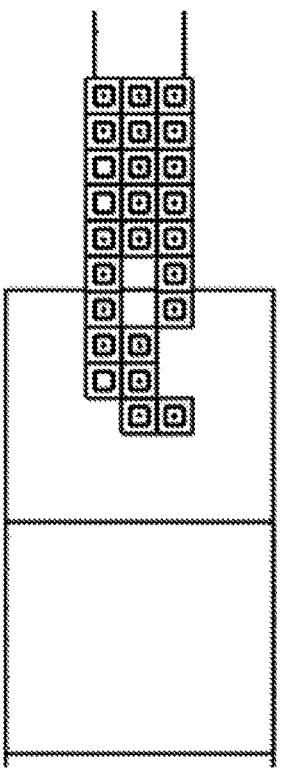
Figure 13E:
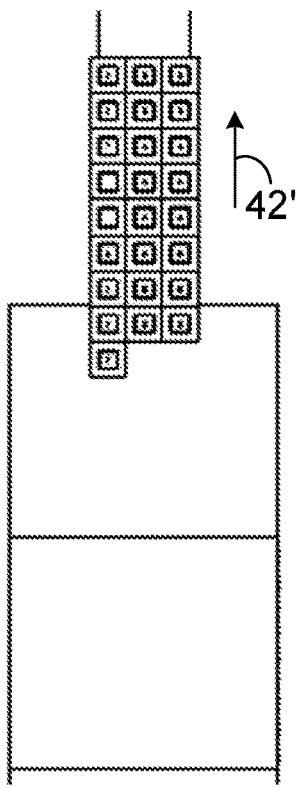
Figure 13F:
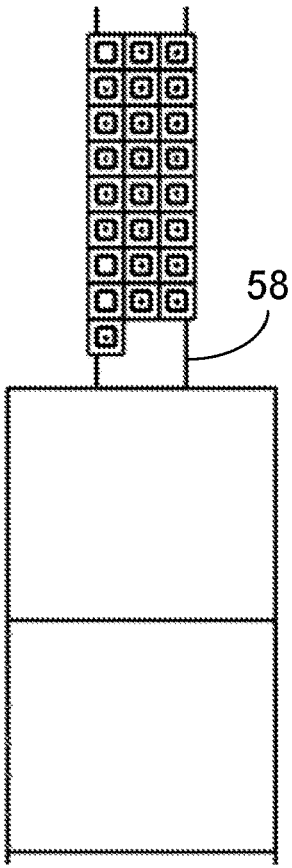

After being used to transport articles along the length of the magnetic conveyor, the mover groups have to be reorganized to pass along the narrow segments in the returnway to the staging area. The permanent magnets in the movers attract ferrous frame members to prevent the movers from falling off the returnway and the reversing elements. How the reorganization occurs for one example configuration of the groups is shown in the sequence of FIG. 13A-FIG. 13F. The group 120 of movers 80 is shown in FIG. 13A on the returnway segment 62 after having discharged an article off the curved discharge reversing segment 69. The columns 124 of movers 80 from the group 120 that are aligned with the narrow return segments 63, 64 are advanced forward in the returnway conveying direction 42' by underlying stators onto the narrow segments as shown in FIGS. 13B and 13C. As shown in FIGS. 13C-13F, the two columns of movers 80' originally flanking the central columns 124 are moved laterally and forward to fill in at the rear of the central columns. The central columns 124 of movers 80 are then in position to be advanced forward along the returnway 58 to be available to fill the gaps in the staging area.

Figure 14:
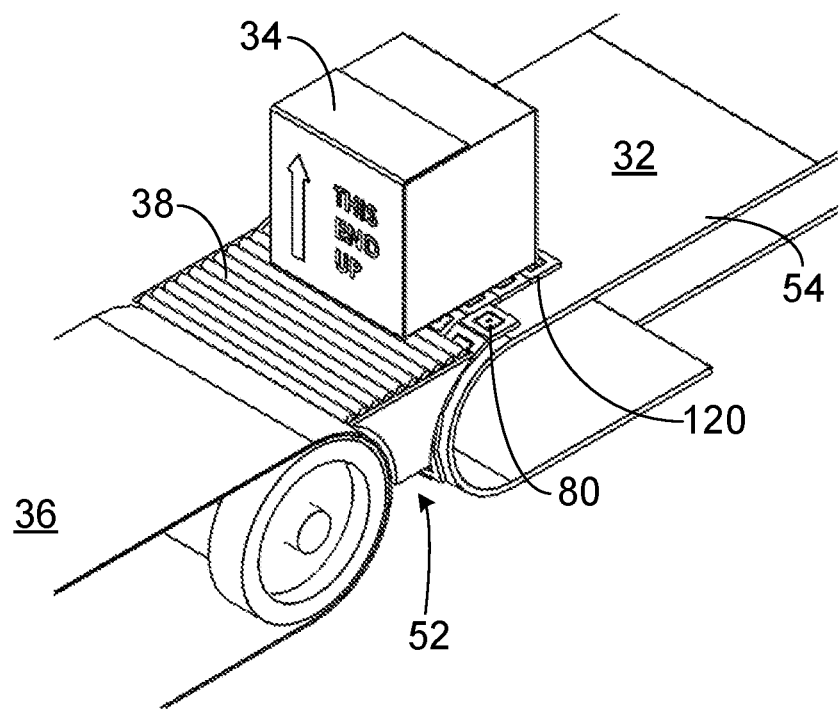
FIG. 14 is an isometric view of the transfer of an article from an infeed conveyor onto the magnetic conveyor of FIG. 2.
Figure 15:
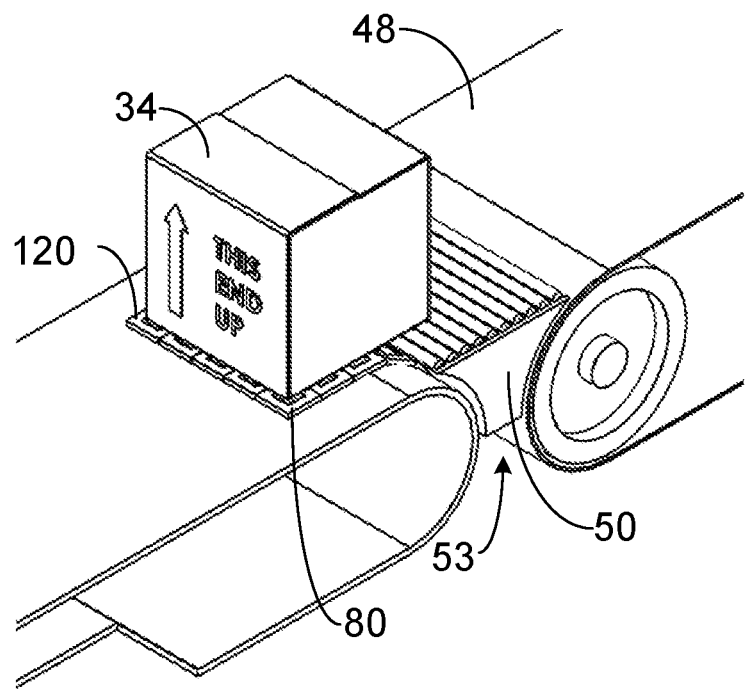
FIG. 15 is an isometric view of the transfer of an article off the end of the magnetic conveyor of FIG. 2 onto a discharge conveyor.

If the gaps 52, 53 between the magnetic conveyor 32 and the infeed and discharge conveyors 36, 48 are too wide for the articles to cross without catching or toppling, the infeed and discharge transfer elements 38, 50 can be used to bridge the gaps as shown in FIGS. 14 and 15. FIG. 14 shows the article 34 transferring across the infeed transfer element 38 from the infeed conveyor 36 and onto the infeed carryway segment 54 atop the group 120 of movers 80. FIG. 15 shows the article 34 separating from the group 120 of movers 80 and onto the discharge transfer element 50 for delivery to the discharge conveyor 54.

Figure 17A:
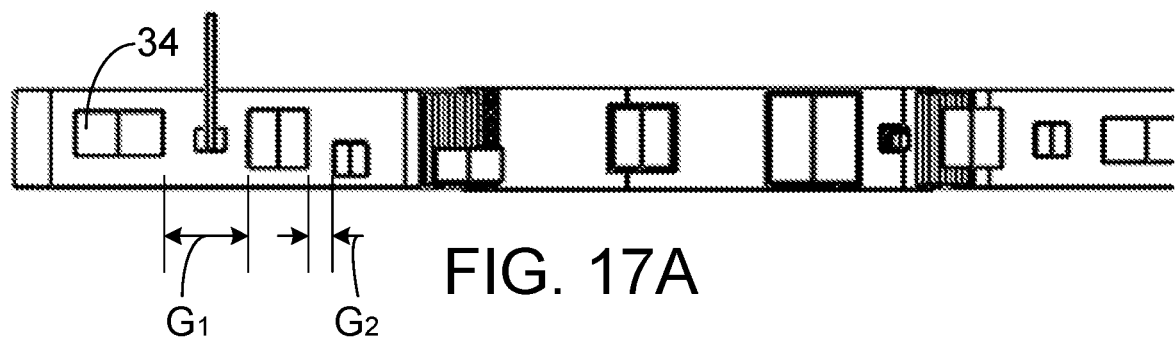
FIGS. 17A-17C are sequential plan views of the magnetic conveyor of FIG. 1 illustrating the centering and gapping of a stream of articles.
Figure 17B:
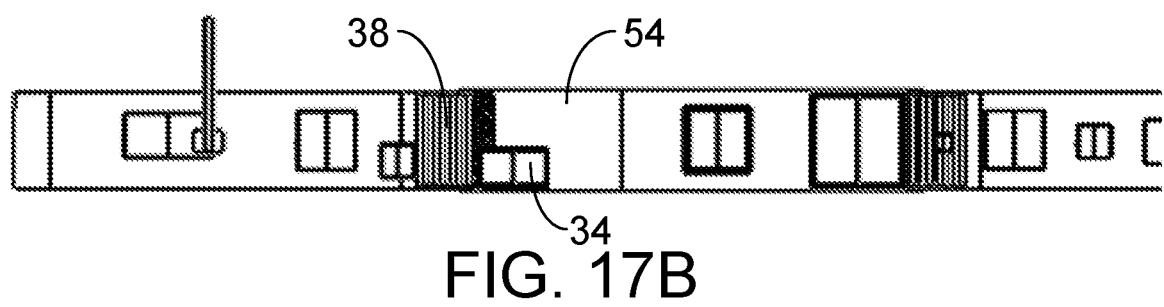
Figure 17C:
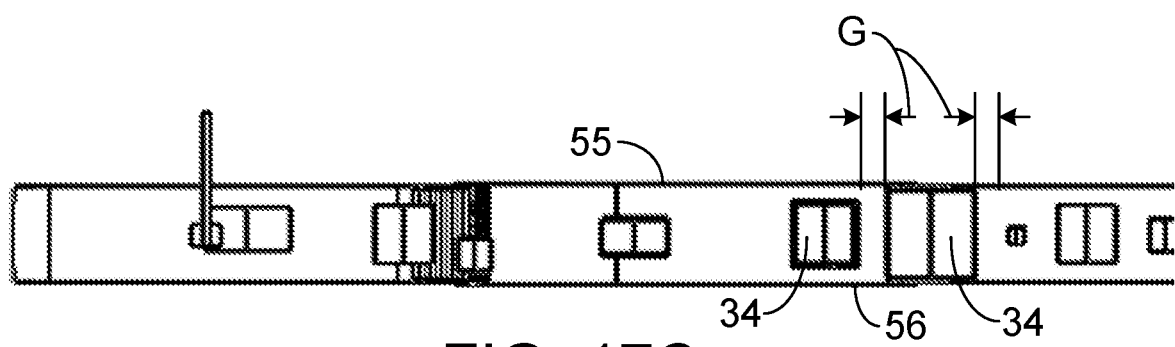

The full length of the carryway 44 of the magnetic conveyor 32 used to form uniform gaps between consecutive items and center them is shown in the sequence of FIGS. 17A-17C. Articles 34 on the infeed conveyor 36 are fed to the magnetic conveyor 32 with random gaps $G_1$, $G_2$ between consecutive articles. After crossing the infeed transfer element 38, the articles 34 are centered on the infeed carryway segment 54 by the action of its two-direction stators. Then the gaps G between consecutive articles 34 are made uniform on the downstream carryway segments 55, 56 by appropriately adjusting the forward speeds of the groups of supporting movers.

Figure 18:
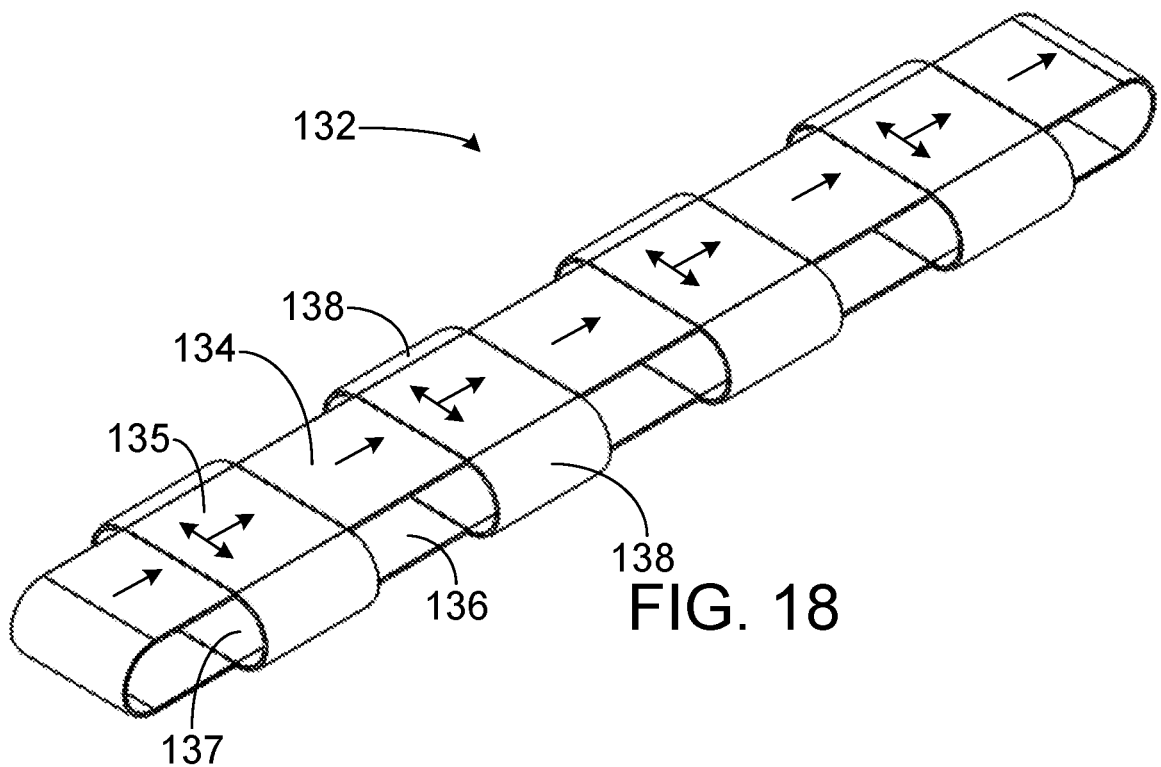
FIG. 18 is an isometric view of another version of the stator portion of a magnetic conveyor configured as a sorter.

A magnetic conveyor can be used to sort articles to multiple destinations as shown in FIG. 18. The magnetic conveyor 132 has first carryway and returnway segments 134, 136 having one-direction stators alternating along its length with second carryway and returnway segments 135, 137 having two-direction stators. The second carryway segments 135 are above the second returnway segments 137 and connected by curved reversing segments 138 at each end. The reversing segments 138 have one-direction stators.

Figure 19A:
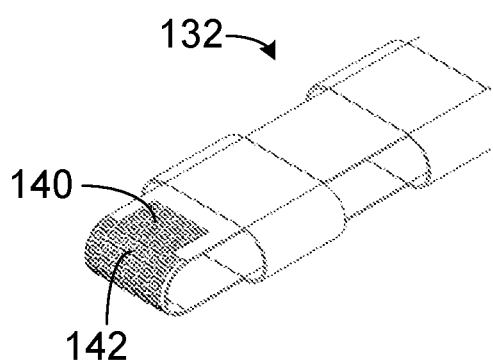
FIGS. 19A-19D are sequential views of the infeed end of the magnetic conveyor of FIG. 18 illustrating the motion of the movers in sorting and reorganizing.
Figure 19B:
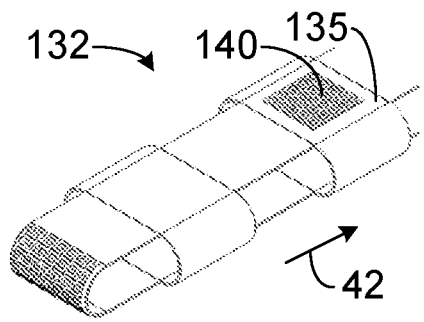
Figure 19C:
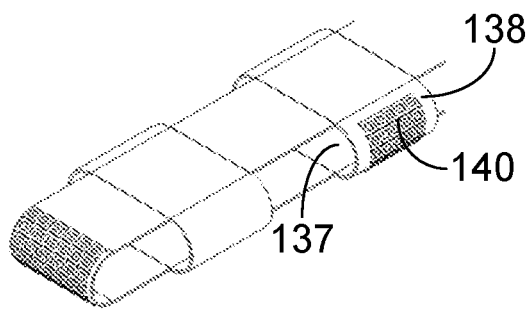
Figure 19D:
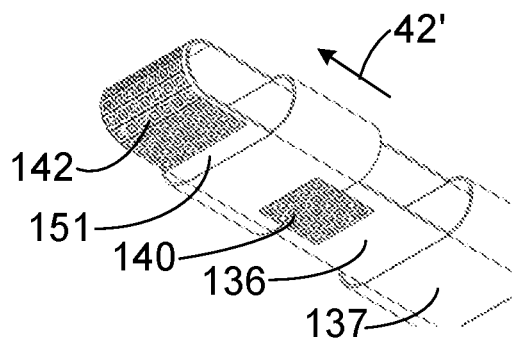

An example of the sorting operation of the magnetic conveyor is shown in FIGS. 19A-19D. An article is not shown on the supporting group 140 of movers for clarity. In FIG. 19A the supporting group 140 of movers starts to separate from the staging area 142 after receiving an article from an infeed conveyor. The processor, with knowledge of the sorting destination, energizes the stators to advance the article on the supporting group 140 of movers in the conveying direction 42 to the selected sorting destination in FIG. 19B. When the group 140 of movers is completely on the second carryway segment 135 at the selected sort position, the processor activates the Y-coil set in the two-direction stator in the segment to sort the article off the magnetic conveyor 132 to the right, as indicated by FIG. 19C. The group 140 of movers is advanced around the reversing segment 138 and onto the second returnway segment 137 by the reversing segment's one-direction stator. The returnway segments 136, 151 are then energized to advance the supporting group 140 of movers back to the staging area 142 in the returnway conveying direction 42'. Because the second carryway and returnway segments 135, 137 include two-direction stators, they can be controlled by the processor to move the mover group 140 in pass-through or left and right sorting directions on the carryway and to receive the mover group 140 from either direction on the returnway and redirect it perpendicularly toward the staging area 142.

Figure 20A:
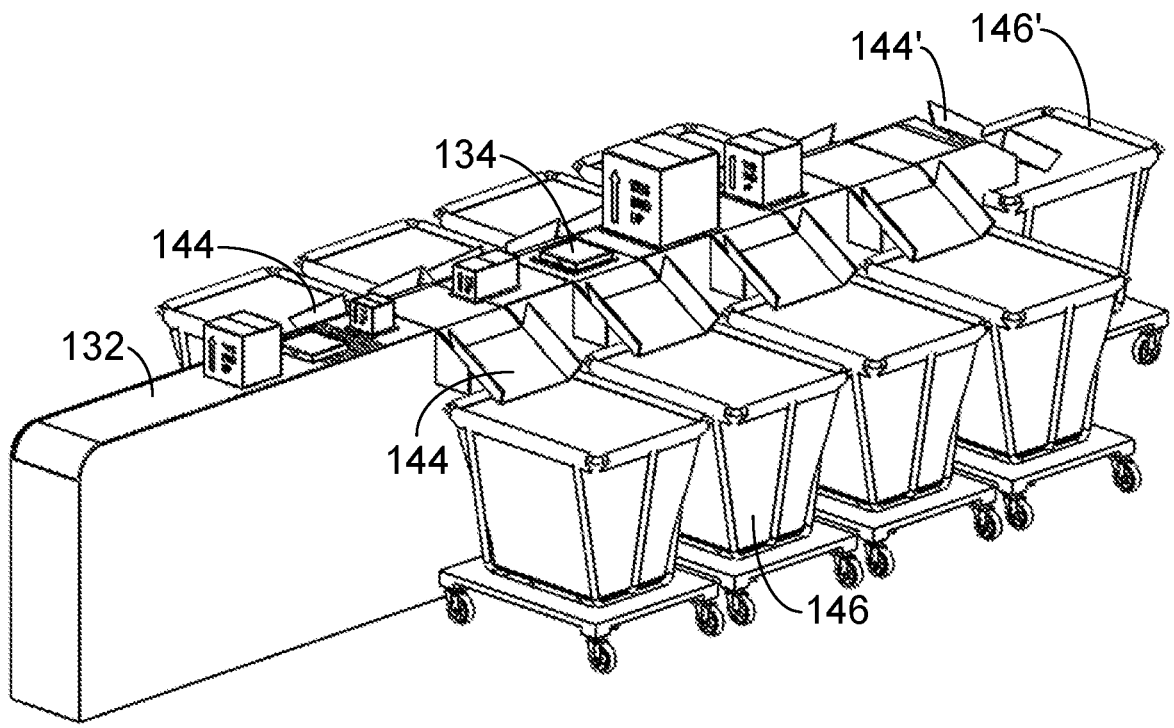
FIGS. 20A and 20B are sequential isometric views of a magnetic conveyor as in FIG. 18 illustrating sorting articles into bins via chutes.
Figure 20B:
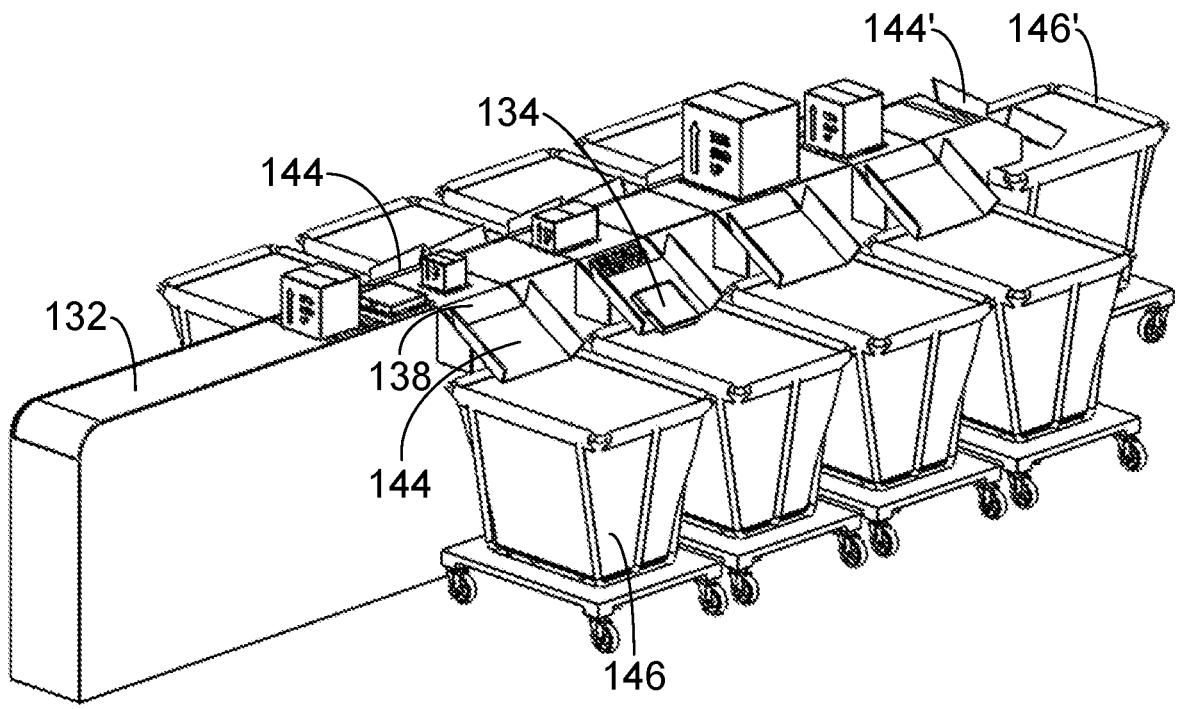

The magnetic conveyor 132 of FIGS. 18 and 19A-19B is shown in FIGS. 20A and 20B sorting articles 134 bidirectionally left and right at multiple sorting positions to multiple sorting destinations. Chutes 144 adjacent the reversing segments 138 at each sorting position on each side of the conveyor 132 receive articles 134 sorted off the sides. The sorted articles slide down the chutes 144 and land in bins 146. Articles not sorted off the sides of the magnetic conveyor 132 exit off its end onto a chute 144' and slide into a bin 146' that collects unsorted articles.

What is claimed is:

1. A magnetic conveyor comprising:
an array of stator elements arranged in rows and columns on a conveying path extending in length in a conveying direction and energizable to produce electromagnetic flux waves;
a plurality of movers having permanent magnets with magnetic fields interacting with the electromagnetic flux waves to move along and across the conveying path in a conveying direction;
a staging area on the conveying path in which the array of stator elements are energized to arrange the movers in rows and columns above the stator elements;
wherein an article transferred onto the conveying path atop a group of movers in the staging area is conveyed on the conveying path by the group of movers.

2. A magnetic conveyor as claimed in claim 1 wherein the group of movers is a rectangular array of movers whose dimensions are the minimum required to seat the article on top without overhang.

3. A magnetic conveyor as claimed in claim 1 wherein the conveying path comprises a series of segments, each of which is formed by an array of one-direction stator elements having coil sets producing electromagnetic flux waves in the conveying direction or by an array of two-direction stator elements having two coil sets capable of propagating electromagnetic flux waves in any direction.

4. A magnetic conveyor as claimed in claim 1 comprising:
an imaging system capturing images of articles to be conveyed along the conveying path;
a processor using the digital images to compute footprints of the articles and to identify the group of movers onto which an article is transferred and to selectively energize the stator elements independently to control the speed or direction of the group of movers on the conveying path.

5. A magnetic conveyor as claimed in claim 1 comprising a plurality of sensors disposed with the stator elements at sensor positions along the conveying path and sending sensor signals indicating the presence of a mover to the processor for use in controlling the speed or direction.

6. A magnetic conveyor comprising:
a carryway extending in length in a conveying direction from a first carryway end to a second carryway end and including a series of carryway segments;
a returnway extending in length from a first returnway end to a second returnway end and including a series of returnway segments;
a curved first reversing segment extending from the second carryway end to the first returnway end and a curved second reversing segment extending from the second returnway end to the first carryway end to form an endless conveying path;
a plurality of one-direction stators each producing an electromagnetic flux wave traveling in the conveying direction parallel to the conveying path;
a plurality of two-direction stators each capable of producing a first electromagnetic wave traveling in a first direction and a second electromagnetic wave traveling in a second direction transverse to the first direction;
wherein the carryway includes one or more one-direction stators or two-direction stators;
wherein the returnway includes one or more two-direction stators;
wherein the curved first and second reversing segments each include a one-direction stator or a two-direction stator;
a plurality of article-supporting movers having permanent magnets and arranged in rows and columns and selectively driven by the one-direction stators and the two-direction stators to convey articles along and across the endless conveying path.

7. The magnetic conveyor as claimed in claim 6 wherein each of the movers comprises a housing having a top side and a bottom side and a periphery bounding a central cavity indented inward of the periphery, wherein one of the permanent magnets resides in the cavity.

8. The magnetic conveyor as claimed in claim 7 wherein the housing is a square disk.

9. The magnetic conveyor as claimed in claim 7 wherein the central cavity opens onto one of the top side and the bottom side.

10. The magnetic conveyor as claimed in claim 6 wherein the first direction is parallel to the conveying direction and wherein the second direction is perpendicular to the first direction.

11. The magnetic conveyor as claimed in claim 6 wherein each of the two-direction stators comprises a plurality of two-direction stator elements arranged in an array of rows and columns of two-direction stator elements each having a first coil set and a second coil set.

12. The magnetic conveyor as claimed in claim 11 wherein the first coil set has a magnetic axis in the first direction and the second coil set has a magnetic axis in the second direction.

13. The magnetic conveyor as claimed in claim 12 comprising a sensor disposed in individual ones of the two-direction stator elements to detect the position of a mover.

14. The magnetic conveyor as claimed in claim 6 comprising a two-direction stator in a first carryway segment at the first carryway end followed by a one-direction stator in a second carryway segment.

15. The magnetic conveyor as claimed in claim 6 comprising a two-direction stator in a first returnway segment at the first returnway end, a two-direction stator in a second returnway segment at the second returnway end, and a one-direction stator in a third returnway segment between the first and second returnway segments.

16. The magnetic conveyor as claimed in claim 15 wherein the third returnway segment is narrower than the first and second returnway segments.

17. The magnetic conveyor as claimed in claim 6 comprising a first plurality of carryway segments each having a two-direction stator and a second plurality of carryway segments each having a one-direction stator, wherein each of the first plurality of carryway segments alternate with each of the second plurality of carryway segments along the length of the carryway.

18. The magnetic conveyor as claimed in claim 17 comprising a first plurality of returnway segments each having a two-direction stator and a second plurality of returnway segments each having a one-direction stator, wherein individual ones of the first plurality of returnway segments alternate with individual ones of the second plurality of returnway segments along the length of the returnway.

19. The magnetic conveyor as claimed in claim 18 wherein the first plurality of carryway segments are vertically aligned with first plurality of returnway segments.

20. The magnetic conveyor as claimed in claim 18 comprising curved third and fourth reversing segments each having a one-direction stator connected between one of the two-direction stators in the carryway segments and a corresponding one of the two-direction stators in the returnway segments.

21. A conveyor system comprising:
a magnetic conveyor as claimed in claim 20;
a plurality of sorting destinations at some or all of the curved third and fourth reversing segments to receive articles transferred off the carryway.

22. A conveyor system as claimed in claim 21 wherein individual ones of the sorting destinations include:
a chute adjacent an associated curved third or fourth reversing segment to receive articles sorted off the carryway; and
a bin into which the articles sliding down the chute land.

23. A conveyor system comprising:
a magnetic conveyor as claimed in claim 6;
an infeed conveyor conveying articles;
an infeed transfer element receiving articles from the infeed conveyor and transferring the articles to the magnetic conveyor at the first carryway end;
a discharge conveyor;
a discharge transfer element transferring articles from the second carryway end of the magnetic conveyor to the discharge conveyor.

24. A magnetic conveyor as claimed in claim 6 comprising:
a processor;
program memory;
a plurality of sensors disposed in the carryway and in the returnway at sensor positions, each sensor sending sensor signals to the processor indicating the presence of one the movers at the sensor position;
wherein the processor executing program instructions stored in the program memory:
determines the position of each of the movers from the sensor signals;
computes a subsequent movement increment for each of the movers;
sends output signals to energize the one-direction stators and the two-direction stators to move each mover the subsequent movement increment.

25. A magnetic conveyor as claimed in claim 6 comprising a staging area for the movers extending opposite the conveying direction from a front at the first carryway end to a rear on the returnway, wherein the movers are aligned in rows and columns in the staging area without gaps toward the front of the staging area to receive an article.

\* \* \* \* \*